US011084364B2

(12) United States Patent
Chen et al.

(10) Patent No.: US 11,084,364 B2
(45) Date of Patent: Aug. 10, 2021

(54) VEHICLE

(71) Applicant: Gogoro Inc., Hong Kong (CN)

(72) Inventors: Chih-Hao Chen, Hsinchu (TW); Chia-Hao Chang, New Taipei (TW)

(73) Assignee: Gogoro Inc., Hong Kong (CN)

( * ) Notice: Subject to any disclaimer, the term of this patent is extended or adjusted under 35 U.S.C. 154(b) by 404 days.

(21) Appl. No.: 15/987,603

(22) Filed: May 23, 2018

(65) Prior Publication Data

US 2018/0339584 A1 Nov. 29, 2018

Related U.S. Application Data

(60) Provisional application No. 62/510,194, filed on May 23, 2017.

(51) Int. Cl.
*B60K 1/04* (2019.01)
*B62K 11/02* (2006.01)
(Continued)

(52) U.S. Cl.
CPC ............. *B60K 1/04* (2013.01); *B60K 7/0007* (2013.01); *B62K 11/02* (2013.01); *B62K 11/04* (2013.01); *B60K 2001/0422* (2013.01); *B60K 2007/0046* (2013.01); *B60K 2007/0061* (2013.01); *B60Y 2200/12* (2013.01); *B60Y 2200/126* (2013.01); *B62J 43/00* (2020.02); *B62K 2202/00* (2013.01); *B62K 2204/00* (2013.01)

(58) Field of Classification Search
CPC ............. B60K 1/04; B60K 2001/0405; B60K 2001/0422; B60K 7/007; B60K 2007/0046; B60K 2007/0061; B62K 2202/00; B62K 11/02; B62K 11/04; B62J 43/00; B60Y 2200/12; B60Y 2200/126
See application file for complete search history.

(56) References Cited

U.S. PATENT DOCUMENTS

2013/0256046 A1\* 10/2013 Kyoden ................... B62M 7/12
180/68.5
2015/0075888 A1\* 3/2015 Duncan ................ B62K 25/283
180/219

(Continued)

FOREIGN PATENT DOCUMENTS

CN 1847080 A 10/2006
CN 103140414 A 6/2013
(Continued)

OTHER PUBLICATIONS

Office Action received for co-pending Chinese Patent Application No. CN201810501860.1; Applicant: Gogoro Inc., dated Sep. 26, 2019, 9 pages.

(Continued)

*Primary Examiner* — Minnah L Seoh
*Assistant Examiner* — Maurice L Williams
(74) *Attorney, Agent, or Firm* — Perkins Coie LLP

(57) ABSTRACT

A vehicle includes a main frame, a power unit, a power controlling unit, and a battery receiving module. The power unit, a power controlling unit, and a battery receiving module are disposed on the main frame respectively. The battery receiving module is disposed between the power unit and the power controlling unit along a front-rear direction of the vehicle.

23 Claims, 7 Drawing Sheets

(51) Int. Cl.
   *B62K 11/04*   (2006.01)
   *B60K 7/00*   (2006.01)
   *B62J 43/00*   (2020.01)

(56) References Cited

U.S. PATENT DOCUMENTS

| | | | |
|---|---|---|---|
| 2015/0280467 A1 | 10/2015 | Matsuda | |
| 2016/0304151 A1* | 10/2016 | Di Benedetto | B62M 7/00 |
| 2018/0118298 A1* | 5/2018 | David | B62K 11/06 |
| 2018/0304713 A1* | 10/2018 | Kaskowicz | F03B 1/00 |

FOREIGN PATENT DOCUMENTS

| | | |
|---|---|---|
| TW | M247431 | 10/2004 |
| TW | 200426072 A | 12/2004 |
| TW | 200526458 A | 8/2005 |
| TW | 200630255 A | 9/2006 |
| TW | 201311507 A | 3/2013 |
| TW | I507311 B | 11/2015 |
| TW | 201628905 A | 8/2016 |
| TW | 202045385 A | 12/2020 |

OTHER PUBLICATIONS

Office Action Received for Taiwan Patent Application No. TW107117614; Applicant: Gogoro Inc., dated May 20, 2019, 13 pages.
TW Office Action received for co-pending TW Patent Application No. 107117614; Applicant: Gogoro Inc., dated Apr. 13, 2020, 16 pages.
Taiwanese Office Action issued for TW Application No. 109123249, Applicant: Gogoro Inc., dated Feb. 2, 2021, 4 pages.

\* cited by examiner

VEHICLE

CROSS-REFERENCE TO RELATED APPLICATION

This application claims priority to U.S. Provisional Application Ser. No. 62/510,194, filed May 23, 2017, which is herein incorporated by reference.

BACKGROUND

The present invention relates to a vehicle.

DESCRIPTION OF RELATED ART

In general, in a two-wheeled vehicle, the ratio of the weight of the vehicle to which the front wheel and the rear wheel are subjected has a great influence on the rider's handling. In a typical two-wheeled vehicle, the weight of the engine and related components is much greater than the weight of other components in the vehicle body. Furthermore, in a scooter-type two-wheeled vehicle, due to the structural limitations of the vehicle, it is necessary to dispose the engine and other related components in the rear of the vehicle. As a result, the rear wheel of the vehicle will have a larger counterweight than that of the front wheel, and then when a rider drives the vehicle, the rider will feel inflexible on the control of the vehicle, and may also cause the rear wheel to have a relatively large inertial force due to the inertia of the object during emergency riding, and thus it is not easy to stop the vehicle relative to the ground.

SUMMARY

The invention provides a vehicle. The vehicle includes a main frame, a power unit, a power controlling unit, and a battery receiving module. The power unit, a power controlling unit, and a battery receiving module are disposed on the main frame respectively. The battery receiving module is disposed between the power unit and the power controlling unit in a front-rear direction of the vehicle.

In some embodiments of the present disclosure, the main frame includes a front frame, a lower frame, and a rising frame. The lower frame is connected between the front frame and the rising frame.

In some embodiments of the present disclosure, the lower frame extends away from the rising frame along a first extending direction. The rising frame extends away from the lower frame along a second extending direction. The first extending direction of the lower frame and the second extending direction of the rising frame form an obtuse angle.

In some embodiments of the present disclosure, the lower frame extends along a first extending direction. The front frame extends along a second extending direction. The first extending direction of the lower frame is substantially perpendicular to the second extending direction of the front frame.

In some embodiments of the present disclosure, the power controlling unit is disposed on the lower frame and is located at a side of the rising frame adjacent to the front frame.

In some embodiments of the present disclosure, the lower frame includes a left sub-lower frame and a right sub-lower frame. The left sub-lower frame and the right sub-lower frame of the lower frame substantially extend along the front-rear direction of the vehicle. The power controlling unit is disposed between the left sub-lower frame and the right sub-lower frame of the lower frame.

In some embodiments of the present disclosure, the power controlling unit is lower than a top surface of the lower frame facing toward the battery receiving module in a top-bottom direction of the vehicle.

In some embodiments of the present disclosure, the power controlling unit and the battery receiving module are spaced apart from each other in the front-rear direction of the vehicle.

In some embodiments of the present disclosure, the battery receiving module is located at a side of the rising frame adjacent to the front frame.

In some embodiments of the present disclosure, the battery receiving module includes a battery container and a battery connecting unit. The battery container is mounted on the battery connecting unit and covers a center of gravity of the main frame in a top-bottom direction of the vehicle.

In some embodiments of the present disclosure, the power unit is located at a side of the rising frame away from the lower frame. The lower frame is located between the power unit and the battery receiving module in a top-bottom direction of the vehicle.

In some embodiments of the present disclosure, the vehicle further includes a front wheel and a rear wheel. The front wheel is disposed on the main frame. The rear wheel is disposed on the main frame. The lower frame is located between the front wheel and the rear wheel and is spaced apart from the front wheel and the rear wheel in the front-rear direction of the vehicle.

In some embodiments of the present disclosure, an axle of the front wheel and an axle of the rear wheel define a virtual extension surface. The lower frame and the rising frame are respectively located at opposite sides of the virtual extension surface.

In some embodiments of the present disclosure, the lower frame extends along an extending direction substantially perpendicular to the virtual extension surface.

In some embodiments of the present disclosure, an axle of the front wheel and an axle of the rear wheel define a virtual extension surface. The lower frame and the front frame are respectively located at opposite sides of the virtual extension surface.

In some embodiments of the present disclosure, the vehicle further includes a water tank and a side board. The water tank is disposed on the main frame and is located at a side of the rising frame facing away from the lower frame. The side board is disposed on the main frame, covers the rising frame in a width direction of the vehicle, and has a through hole. The water tank is configured to leave or be detachably disposed on the main frame via the through hole of the side board.

In some embodiments of the present disclosure, the main frame further includes a rear frame. The rear frame is connected to an end of the rising frame opposite to the lower frame and substantially extends away from the rising frame along the front-rear direction of the vehicle. The water tank is located between the rear frame and the rising frame.

In some embodiments of the present disclosure, the vehicle further includes an electronic controlling unit and a side board. The electronic controlling unit is disposed on the main frame and is located at a side of the rising frame facing away from the lower frame. The side board is disposed on the main frame, covers the rising frame in a width direction of the vehicle, and has a through hole. The electronic controlling unit is configured to leave or be detachably disposed on the main frame via the through hole of the side board.

In some embodiments of the present disclosure, a center of gravity of the power controlling unit is spaced apart from a center of gravity of the main frame by a first distance in the front-rear direction. A center of gravity of the power unit is spaced apart from a center of gravity of the main frame by a second distance in the front-rear direction. A product of a weight of the power controlling unit and the first distance is substantially equal to a product of a weight of the power unit and the second distance.

The invention further provides another vehicle. The vehicle includes a main frame, an inner device, and a side board. The main frame includes a front frame, a lower frame, and a rising frame. The front frame, the lower frame, and the rising frame are connected in sequence. The internal device is disposed on the main frame and is located at a side of the rising frame facing away from the lower frame. The side board is disposed on the rising frame, covers the rising frame in a width direction of the vehicle, and has a through hole. The internal device is configured to leave or be detachably disposed on the main frame via the through hole of the side board.

In some embodiments of the present disclosure, the main frame further includes a rear frame. The rear frame is connected to an end of the rising frame opposite to the lower frame and substantially extends away from the rising frame in the front-rear direction of the vehicle. The internal device is disposed between the rear frame and the rising frame.

In some embodiments of the present disclosure, the vehicle further includes a front wheel and a rear wheel. The front wheel is disposed on the main frame. The rear wheel is disposed on the main frame. An axle of the front wheel and an axle of the rear wheel define a virtual extension surface. The lower frame and the inner device are respectively located at opposite sides of the virtual extension surface.

In some embodiments of the present disclosure, the internal device is a water tank.

In some embodiments of the present disclosure, the internal device is an electronic controlling unit.

In the aforementioned configurations, the center of gravity of the main frame is substantially located at a central position of the vehicle in the front-rear direction, such that when the vehicle is driven, the stability of the vehicle in the front-rear direction is able to be improved. As a result, the rider is able to more easily control the vehicle and has better comfort during the riding. Furthermore, the battery receiving module is disposed at the center of gravity of the frame and the position of the power controlling unit, the power unit and/or other components in the vehicle is set according to the center of gravity of the main frame. Therefore, the weight distribution of the vehicle on the front wheel and the rear wheel is able to be adjusted to a substantially similar ratio, so that the rider may feel better maneuverability during the riding, and may reduce the instability caused by the inertia when the car body is urgently braking.

Furthermore, since the power controlling unit and the power unit is disposed at a periphery of the battery connecting unit of the battery receiving module, a length of a relevant wiring is able to be shortened, so as to reduce the loss of the power and/or the electric signal due to the length of the relevant wiring.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
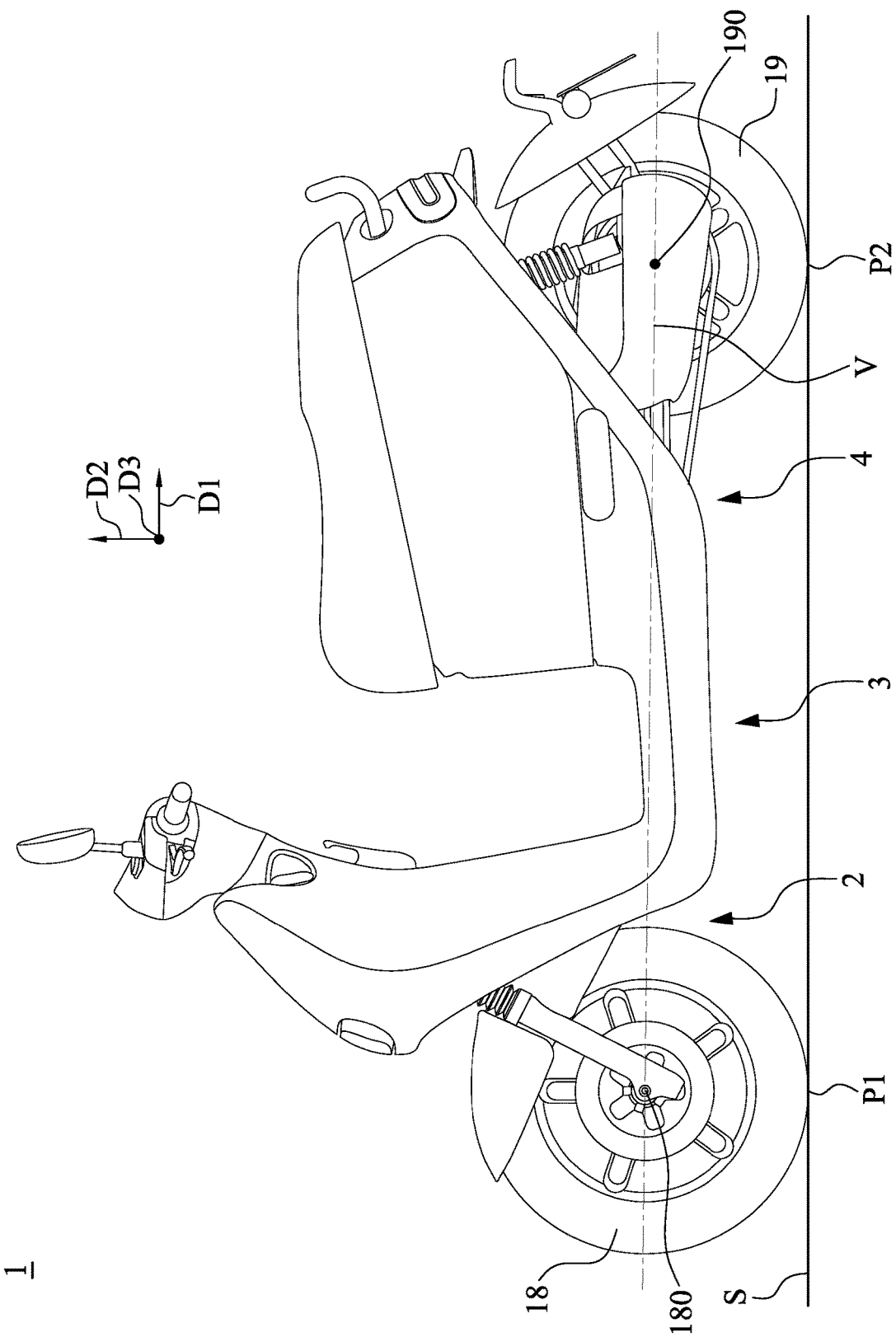
FIG. 1 is a side view of a vehicle in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters hi the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted hi the figures. The apparatus may be otherwise oriented (rotated 90 degrees or at other orientations) and the spatially relative descriptors used herein may likewise be interpreted accordingly.

Reference is made to FIG. 1. FIG. 1 is a side view of a vehicle 1 in accordance with some embodiments of the present disclosure. As shown in FIG. 1, for ease of explanation, a front-rear direction D1, a top-bottom direction D2, and a width direction D3 are defined herein. Specifically, the vehicle 1 includes a front wheel 18 and a rear wheel 19. When the vehicle 1 is on a reference plane S, such as a pavement parallel to the horizon), the front wheel 18 and the rear wheel 19 of the vehicle 1 contact the reference plane S with the first contacting point P1 and the second contacting point P2 located thereon, respectively. An extending direction of a line connecting the first contacting point P1 and the second contacting point P2 is defined as the front-rear direction D1 of the vehicle 1. A top-bottom direction D2 of the vehicle 1 is substantially perpendicular to the front-rear direction D1. A width direction D3 of the vehicle 1 is substantially parallel to the reference plane S and perpendicular to the front-rear direction D1. The vehicle 1 is configured to be moved on the reference plane S by the front wheel 18 and the rear wheel 19 and is able to be at least simply divided into a head portion 2, a footrest portion 3, and a seat portion 4.

Figure 2:
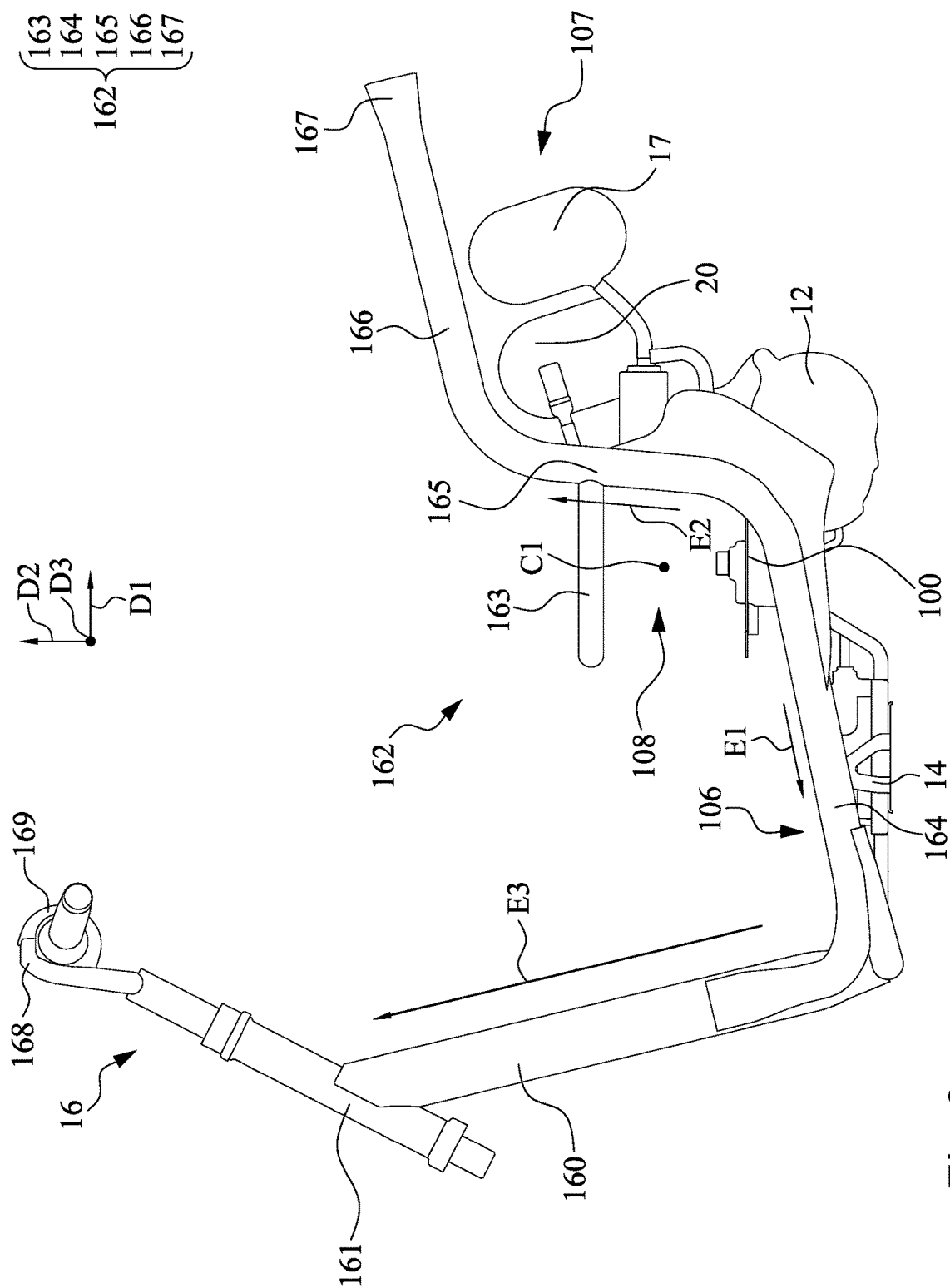
FIGS. 2 and 3 are a side view and a perspective view respectively of a main frame and some relative devices of the vehicle in accordance with some embodiments of the present disclosure.
Figure 3:
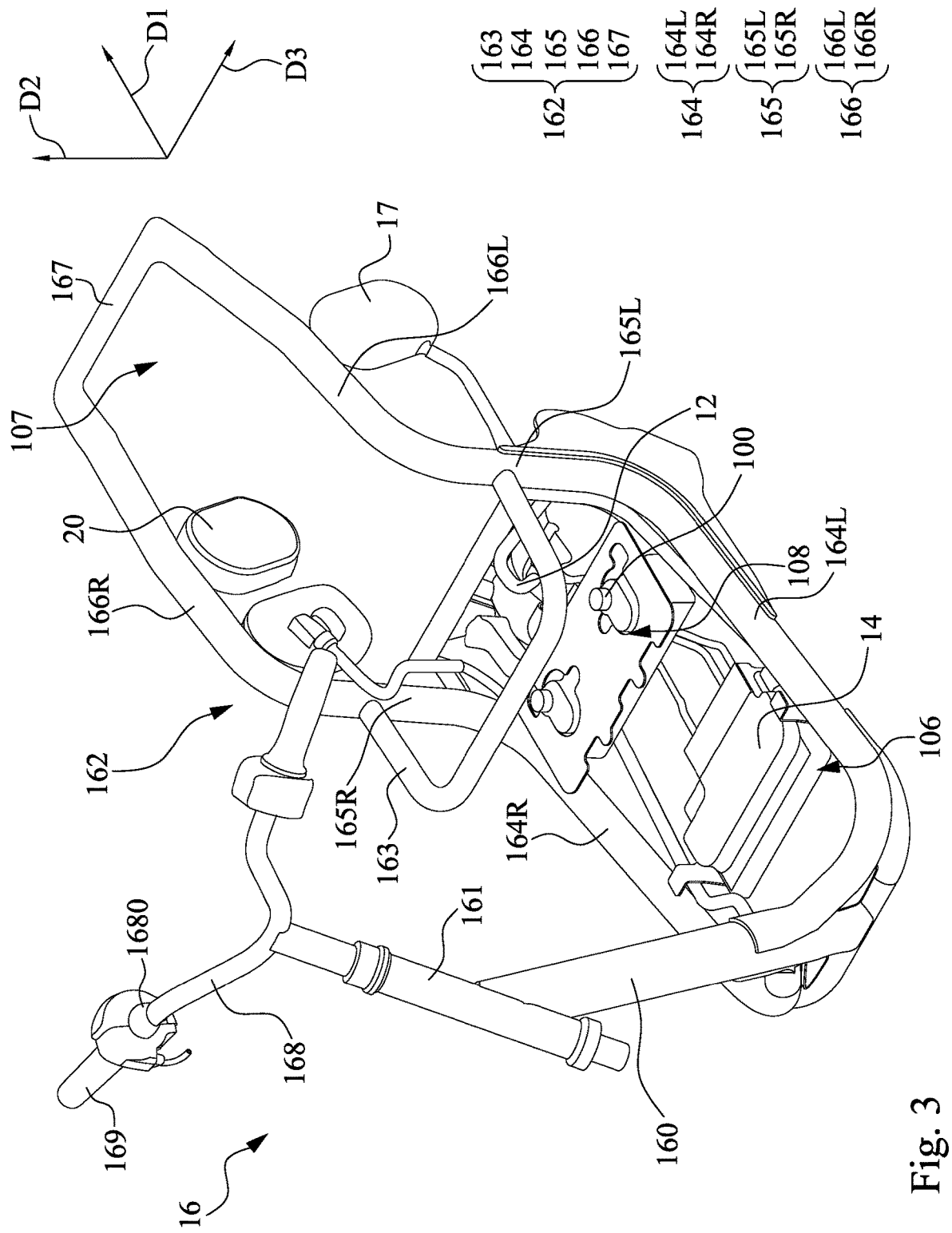
Figure 4:
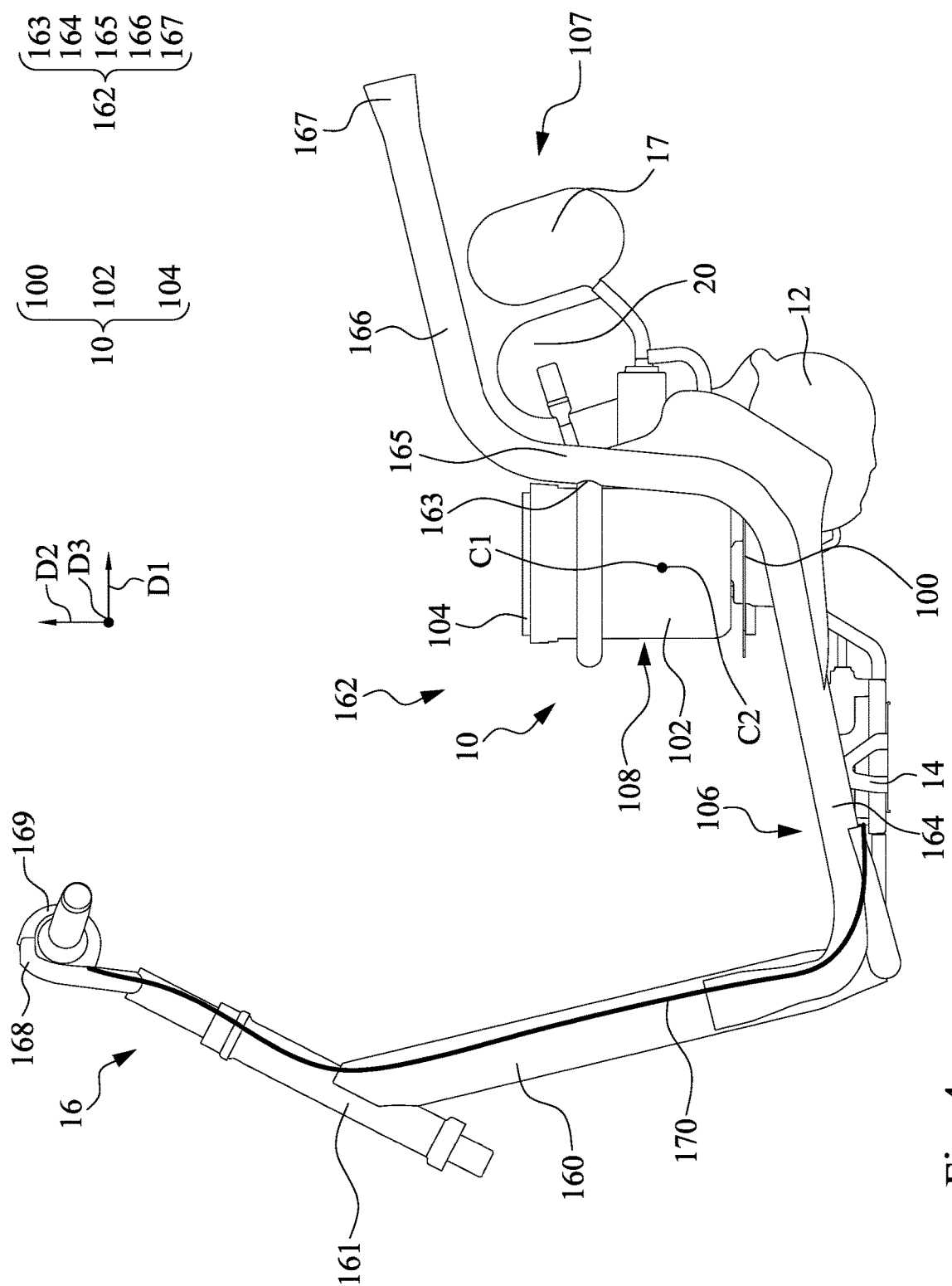
FIG. 4 is a side view of the main frame, a battery container, and some relative devices of the vehicle in accordance with some embodiments of the present disclosure.

Reference is made to FIGS. 2-4. FIGS. 2-4 each is a side view/perspective view of a main frame 16 and some relative devices of the vehicle 1 in accordance with some embodiments of the present disclosure, in which the vehicle 1 shown in FIG. 4 further includes a battery receiving module 10. As shown in FIG. 1, the vehicle 1 includes the main frame 16 and a power controlling unit 14, the battery receiving module 10 (see FIG. 4), a power unit 12, a water tank 17, and an electronic controlling unit (ECU) 20 disposed on the main frame 16. The structure and function of the components and theft relationships are described in detail hereinafter.

In FIGS. 2-4, the main frame includes a front frame 160 and an extending frame 162. The main frame 16 further incudes a handle 168, a hand bar 169, and a steering column 161 connected to the front frame 160. The extending frame incudes a lower frame 164, a rising frame 165, a rear frame 169, a terminal frame 167, and a bracket 163. The handle 168 is disposed on the steering column 161 and substantially extending along the width direction D3 of the vehicle 1. The handle 168 is used to control a direction of travel of the vehicle 1. The steering column 161 of the vehicle 1 supports the handle 168. A side of the steering column 161 opposite to the handle 168 is connected to the front frame 160. A front fork (not shown) is rotatably pivoted at a lower end of the steering column 161 to rotatably support the front wheel 18.

In the embodiment, the hand bar 169 of the main frame 16 is connected to an end 1680 (see FIG. 3) of the handle 168 facing away from the steering column 161. Hence, when the hand bar 169 generate a relative motion with respect to the handle 168 (e.g. the hand bar 169 rotates by a rider relative to the handle 168), a hand bar sensor senses said relative motion and generates an electric signal corresponding to said relative motion, and transmits the electric signal to the power controlling unit 14. In some embodiments, the hand bar sensor includes a variable resistance or hall sensor. When a relative motion is generated, the hand bar sensor is able to sense the corresponding relative motion. After the power controlling unit 14 receives the electric signal, the power controlling unit 14 is able to drive and control the power unit 12 according to the electric signal, thus causing the vehicle 1 to travel and to control the traveling speed of the vehicle 1. In the embodiment, the power controlling unit 14 is a motor control unit (MCU), and the power unit is a motor.

As shown in FIGS. 2-4, the lower frame 164 of the main frame 16 extends away from the rising frame 165 along an extending direction E1 (see FIG. 2) and includes a left sub-lower frame 164L and a right sub-lower frame 164R (see FIG. 3). The lower frame 164 is disposed at the footrest portion 3 and the seat portion 4 (see FIG. 1), is connected between the front frame 160 and the rising frame, and extends from an end of the front frame 160 opposite to the steering column 161 toward the rear of the vehicle 1 in the front-rear direction D1. A first accommodating space 106 (see FIG. 2) is formed between the left and right sub-lower frames 164L, 164R of the lower frame 164. The front frame 160 of the main frame 16 extends along an extending direction E3 (see FIG. 2). In some embodiments, the first extending direction E1 of the lower frame 164 is substantially perpendicular to the extending direction E3.

Furthermore, in FIG. 1, the front wheel 18 and the rear wheel 19 have a front axle 180 and a rear axle 190 respectively. The front axle 180 of the front wheel 18 and the rear axle 190 of the rear wheel 19 define a virtual extension surface V. Specifically, the front axle 180 of the front wheel 18 and the rear axle 190 of the rear wheel 19 fall on the virtual extension surface V. As shown in FIGS. 2-4, the lower frame 164 of the extending frame 162 is located at a side of the virtual extension surface V facing away from the front frame 160 and adjacent to the reference plane S. In other words, the lower frame 164 and the front frame 160 of the extending frame 162 are respectively located at opposite sides of the virtual extension surface V. Similarly, the lower frame 164 of the extending frame 162 is located at a side of the virtual extension surface V facing away from the rising frame 165 and adjacent to the reference plane S. In other words, the lower frame 164 and the rising frame 165 of the extending frame 162 are respectively located at opposite sides of the virtual extension surface V. Hence, the lower frame 164 of the extension frame 162 in the main frame 16 is able to be disposed between the virtual extension surface V and the reference plane 5, so that the weight of the entire main frame 16 is able to be disposed close to the reference plane S. Therefore, when the vehicle 1 is driven, the stability of the vehicle 1 in the top-bottom direction D2 is able to be improved.

As shown in FIGS. 2-4, the rising frame 165 of the main frame extends away from the lower frame 164 along the extending direction E2 (see FIG. 2), further extends in the seat portion 4 of the vehicle, and includes a left sub-rising frame 165L and a right sub-rising frame 165R (see FIG. 3). The left sub-rising frame 165L and the right sub-rising frame 165R of the rising frame 165 are connected between the lower frame 164 and the rear frame 166. The left and right sub-rising frames 165L, 165R respectively extend from ends of the left and right sub-lower frames 164L, 164R of the lower frame 164 opposite to the front frame 160 toward a top of the vehicle 1 in the top-bottom direction D2. In some embodiments, the extending direction E2 of the rising frame 165 and the extending direction E1 of the lower frame form an obtuse angle and substantially perpendicular to the virtual extension surface V (see FIG. 1). Furthermore, the lower frame 164 of the main frame is located between the front wheel 18 and the rear wheel 19 (see FIG. 1) and is spaced apart from the the front wheel 18 and the rear wheel 19 in the front-rear direction D1. Hence, the rising frame 165 of the extension frame 162 in the main frame 16 is able to be disposed between the front wheel 18 and the rear wheel 19, so that the weight of the entire main frame 16 is able to be disposed close to a center of the vehicle in the front-rear direction D1. Therefore, the front wheel 18 and the rear wheel 19 substantially bear the same weight, such that when the vehicle 1 is driven, the stability of the vehicle 1 in the front-rear direction D1 is able to be improved.

As shown in FIG. 2-4, the rear frame 166 of the main frame 16 extends in the seat portion of the vehicle 1 and includes a left sub-rear frame 166L and a right sub-rear frame 166R (see FIG. 3). The left sub-rear frame 166L and the right sub-rear frame 166R of the rear frame 166 are connected between the rising frame 165 and the terminal frame 167. The left and right sub-rear frames 166L, 166R respectively extend from ends of the left and right sub-rear frames 165L, 165R of the rising frame 165 opposite to the lower frame 164 toward the rear of the vehicle 1 in the front-rear direction D1. A second accommodating space 107 is formed between the left and right sub-rear frames 166L, 166R of the rear frame 166. The second accommodating space 107 is able to be provided with a storage compartment (not shown) for storing objects. In the embodiment, the terminal frame 167 is connected between ends of the left and right sub-rear frames 166L, 166R opposite to the rising frame 165 to increase the structural strength of the extending frame 162.

As shown in FIGS. 2-4, the bracket 163 of the main frame 16 is located at a side of the rising frame 16 adjacent to the front frame 160 and forms a third accommodating space 108 with the rising frame 165 and the lower frame 164. The second and third accommodating spaces 107, 108 are arranged in the front-rear direction D1 of the vehicle 1. The third accommodating space 108 is used for accommodating the battery receiving module 10 (see FIG. 4). The bracket 163 is able to increase the structural strength of the extending frame 162, to support the seat portion 4, and to prevent components, such as the battery receiving module 10 shown in FIG. 4, disposed in the third accommodating space 108 from being damaged by pressure and impact force.

As such configuration, a center of gravity C1 (see FIG. 2) of the main frame 16 is located at a side of the seat portion 4 adjacent to the head portion 2, further located in the third accommodating space 108, and further located between the power controlling unit 14 and the power unit 12 in the front-rear direction D1 of the vehicle 1. In the embodiment, the center of gravity C1 of the main frame 16 is substantially located at a central position of the vehicle 1 in the front-rear direction D1. Therefore, the front wheel 18 and the rear wheel 19 substantially bear the same weight, such that when the vehicle 1 is driven, the stability of the vehicle 1 in the front-rear direction D1 is able to be improved. As a result, the rider is able to more easily control the vehicle and has better comfort during the riding.

As shown in FIG. 4, the battery receiving module 10, power unit 12, and the power controlling unit 14 is disposed on the main frame 16. Specifically, the battery receiving module includes a battery connecting unit 100 and a battery container 102. The battery container 102 is mounted on the battery connecting unit 100 and if for storing battery, such as a battery 104 shown in FIG. 4. The battery connecting unit 100 is located below the battery container 102 in the top-bottom direction D2 and plugged into the battery. The battery receiving module 10 is located in the seat portion 4 (see FIG. 1) of the vehicle 1 and further located in the third accommodating space 108 which is formed by the bracket 163 and the rising frame 165. The battery receiving module 10 is located at a side of the lower frame 164 adjacent to the rising frame 165 of the main frame 16. On the other hand, the battery receiving module 10 is located a side of the rising frame 165 adjacent to the front frame 160 of the main frame 16.

In addition, the battery receiving module 10 is located between the power controlling unit 14 and the power unit 12 in the front-rear direction D1 of the vehicle 1. The battery connection unit 100 serves to transmit the electric energy in the battery (e.g. the battery 104) to other components, such as the power controlling unit 14 and/or the electronic controlling unit 20, in the vehicle 1. In some embodiments, the battery receiving module 10 further includes a power conversion module (not shown). The battery receiving module 10 converts the power of the battery into a power source that matches a power required (e.g. an acceptable voltage) by the terminal components, such as the electronic controlling unit 20, a head light, and/or a tail light. In some embodiments, the power conversion module includes a DC/DC conversion module, but the present disclosure is not limited thereto. In some embodiment, the power conversion module is able to adopt different types of conversion modules in response to the design of different AC circuits and/or DC circuits. In some embodiment, the power conversion module is placed in other positions in the vehicle 1 due to demand.

In the embodiment, the battery connecting unit 100 of the battery receiving module 10 covers the center of gravity C1 of the main frame 16. Specifically, the size, structure, and weight of each part in the frame 16 are designed, such that the center of gravity C1 of the frame 16 falls in the third accommodating space 108, that is, in the battery connecting unit 100 of the battery receiving module 10. When the battery, such as a battery 104 shown in FIG. 4, is placed in the battery connecting unit 100 of the battery receiving module 10, a center of gravity C2 of the battery will be also located in the third accommodating spaces 108 of the main frame 16 and be adjacent to the center of gravity C1 of the frame 16. In some embodiments, when the battery is placed in the battery connecting unit 100 of the battery receiving module 10, the center of gravity C2 of the battery will be substantially coincide with the center of gravity C1 of the frame 16. A position of the third accommodating spaces 108 is substantially located in the middle of the vehicle 1 in the front-rear direction D1. When the rider rides on the vehicle 1, a center of gravity of the rider will be located above the third housing space 108 in the top-bottom direction D2. Hence, the center of gravity C1 of the frame 16, the center of gravity C2 of the battery, and the center of gravity of the rider are substantially located in the middle of the vehicle 1 in the front-rear direction D1, such that when the vehicle 1 is driven, the stability of the vehicle 1 in the front-rear direction D1 is able to be improved.

As shown in FIGS. 2-4, the power controlling unit 14 is located in the footrest portion 3 of the vehicle 1. Specifically, the power controlling unit 14 is located at a side of the lower frame 164 adjacent to the front frame 160 and further located in the first accommodating space 106 of the lower frame 164. The power controlling unit 14 is located at a side of the lower frame 164 adjacent to the front frame 160, and is lower than a top surface of the lower frame 164 facing toward the battery receiving module 10 in a top-bottom direction D2 of the vehicle 1. The power controlling unit 14 is space apart from the battery receiving module 10 in the front-rear direction D1. As such configuration, the power controlling unit 14 is able to be protected by the lower frame 164 to prevent the power controlling unit 14 from being damaged due to an external force. The power controlling unit 14 is configured to control the activation or deactivation of the power unit 12 and to control the intensity (e.g. the intensity of the power unit 12 corresponds to a rotation speed of the power unit 12 or a speed of the vehicle 1 during the driving) of the power unit 12.

The power controlling unit 14 is located between the hand bar 169 and the power unit 12 in the front-rear direction D1 and is electrically connected to the power unit 12. The power controlling unit 14 receives the power output from the battery receiving module 10, and outputs the power received by the battery receiving module 10 to the power unit 12 based on the instruction issued by the hand bar 169, so as to drive the power unit 12. Then, the power unit 12 drives the rear wheel 19 to drives the vehicle 1 to travel.

As shown in FIGS. 2-4, the power unit 12 is located outside of the lower frame 164 of the main frame 16, adjacent to the rising frame 165, and further located in the third accommodating space 108 of the rear frame 108. That is, the power unit 12 is located at a side of the rising frame 165 facing away from the lower frame 164 of the main frame 16. The lower frame 164 of the main frame is located between the power unit 12 and the battery receiving module 10 in the top-bottom direction D2. The power unit 12 and the battery receiving module 10 are respectively located at opposite sides of the rising frame 165 of the main frame 16. In some embodiments, a position of the power controlling unit 14 is able to be exchanged with a position of the power unit 12. In addition, since the driving mode of the vehicle 1 is driven by the rear wheels 19 to drive the vehicle 1 to travel, the present disclosure places the power unit 12 closer to the rear wheels 19 to reduce the power consumption caused by the transmission, but the present disclosure is not limited thereto.

A center of gravity of the power controlling unit 14 is spaced apart from the center of gravity C1 of the main frame 16 by a first distance, and a center of gravity of the power unit 12 is spaced apart from the center of gravity C1 of the main frame 16 by a second distance in the front-rear direction D1. A first product of a weight of the power controlling unit 14 and the first distance is substantially equal to a second product of a weight of the power unit 12 and the second distance. In the embodiment, in order to improve the stability of the vehicle 1 in the front-rear direction D1, the present embodiment places the battery receiving module 10 on the center of gravity C1 of the main frame 16 and configures the power controlling unit 14 and the power unit 12 according to the center of gravity C1 of the main frame 16. For example, when the battery receiving module 10 is disposed at the center of gravity C1 of the main frame 16, the configuration of the power controlling unit 14 and the power unit 12 of the vehicle 1 satisfies the following equation (1):

$$m1 \times d1 = m2 \times d2 \qquad (1);$$

In which m1 is the weight of the power controlling unit 14, d1 is the distance between the center of gravity of the power controlling unit 14 and the center of gravity C1 of the main frame 16 (also referred to as the first distance), m2 is the weight of the power unit 12, and d2 is the distance between the center of gravity of the power unit 12 and the center of gravity C1 of the main frame 16 (also referred to as the second distance). In the embodiment, since the power controlling unit 14 has the ability to handle a high voltage/ high current power supply, it is provided with a high voltage/high current resistant element and a heat dissipating element, such as heat sink, water cooling module, and/or air cooling module. Therefore, the weight of the power control unit 14 is close to the weight of the power unit 12, and thus said first product of the weight of the power controlling unit 14 and the first distance d1 is not far apart from said second product of the weight of the power unit 12 and the second distance d2 on the order of magnitude.

In some embodiments, the positions of the power control unit 14 and the power unit 12 in the vehicle 1 are configured in accordance with actual usage requirements. If a weight of another component in the vehicle 1 is similar to that of the power controlling unit 14, the power unit 12, or the battery 104, the positions of the power controlling unit 14 and the power unit 12 in the vehicle 1 may also consider the influence of said component. Furthermore, other elements in the vehicle 1 may also be configured according to the above equation. As a result, the center of gravity C1 of the frame 16, the center of gravity C2 of the battery 104, and the center of gravity of the rider are all substantially located at the center of the vehicle 1 in the front-rear direction D1. Hence, a center of gravity of the entire vehicle 1 and the center of gravity of the rider are both substantially located in the middle of the vehicle 1 in the front-rear direction D1, and the weight can be evenly distributed to the front wheel 18 and the rear wheel 19, thereby improving the stability of the vehicle 1 while driving.

On the contrary, in order to improve the stability of the vehicle 1 during the driving in the top-bottom direction D2, the battery receiving module 10 is disposed at the center of gravity C1 of the main frame 16, and most of other components are disposed on a side of the main frame 16 close to the reference plane S. As such configuration, since the center of gravity of the vehicle 1 approaches the reference plane S in the top-bottom direction D2, any action of the rider is able to have a lower potential/kinetic conversion during the riding, compared to common commercial vehicles. As a result, the rider is able to more easily control the vehicle and has better comfort during the riding.

Furthermore, in the embodiment, the water tank 17 and the electronic controlling unit 20 is located in the second accommodating space 107 formed by the rear frame 166. The water tank 17 (and the electronic controlling unit 20) and the lower frame 164 are respectively located at opposite sides of the virtual extension surface V (see FIG. 1). In addition, the water tank 17 is disposed on the main frame 16, is located at a side of the rising frame 165 facing away from the lower frame 164 and further located below the rear frame 166. Moreover, the water tank 17 is located between the rear frame 166 and the power unit 12 in the top-bottom direction D2. The water tank 17 is configured to flow the liquid contained therein and cool the power unit 12 and/or the power controlling unit 14 to ensure that the power unit 12 and/or power control unit 14 can be maintained in a normal operation. Similarly, the electronic controlling unit 20 is disposed on the main frame 16, is located at a side of the rising frame 165 facing away from the lower frame 164 and further located below the rear frame 166. Moreover, the electronic controlling unit 20 is located between the rear frame 166 and the power unit 12 in the top-bottom direction D2. In the embodiment, the electronic controlling unit 20 is configured to control/switch the state of components other than the power unit 12 in the vehicle 1, such as operation status of the vehicle 1, the head light, the tail light, and/or the direction light (not shown). In the embodiment, the vehicle 1 further includes a primary battery module (not shown). The primary battery module is disposed near the electronic controlling unit 20 and is set in vehicle 1 in a manner similar to that of the electronic controlling unit 20. When the battery 104 does not supply power to the electronic control unit 20, the primary battery module supplies power to the electronic control unit 20, but the present disclosure is not limited thereto. The electronic controlling unit 20 and/or the primary battery module is/are able to be selectively implemented as required.

Figure 5:
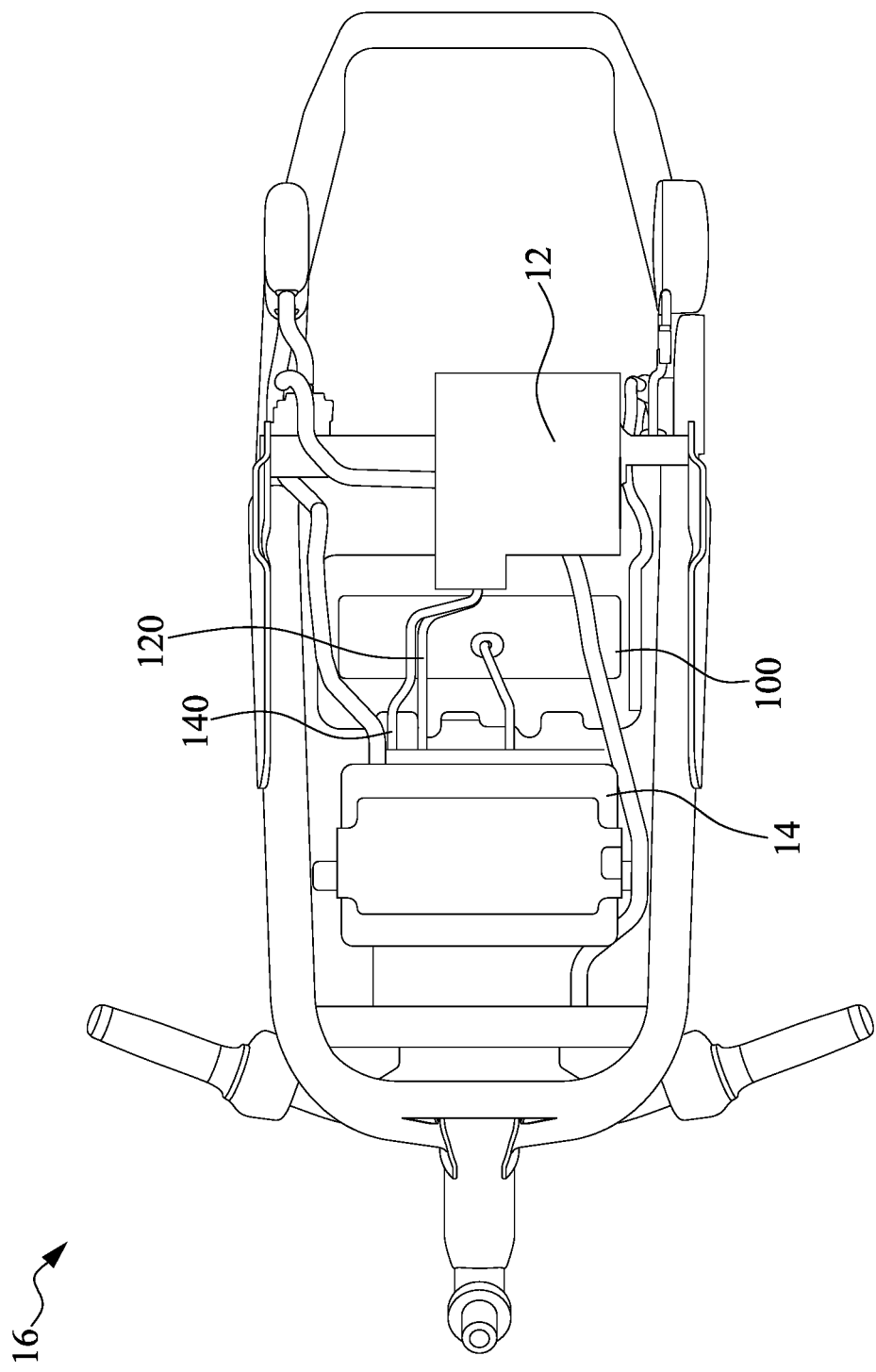
FIG. 5 is bottom view of the main frame and some relative devices of the vehicle in accordance with some embodiments of the present disclosure.

Reference is made FIG. 5. FIG. 5 is bottom view of the main frame 16 and some relative devices of the vehicle 1 in accordance with some embodiments of the present disclosure. As shown in FIGS. 4 and 5, since the power controlling unit 14 and the power unit 12 is disposed at a periphery of the battery connecting unit 100 of the battery receiving module 10, a length of a relevant wiring is able to be shortened, so as to reduce the loss of the power and/or the electric signal due to the length of the relevant wiring.

Reference is made to FIGS. 4 and 5. In some embodiments, the power controlling unit 14 and the power unit 12 are respectively located at opposite sides of the rising frame 165 in front-rear direction D1 of the vehicle 1 and adjacent to the rising frame 165. Therefore, length of the wirings (e.g. transmission lines 120, 140) between the controlling unit 14 and the power unit 12 is able to be shortened, so as to reduce the loss of the power and/or the electric signal due to the length of the wirings and to reduce the impedance during the transmitting of power and/or electrical signal. Hence, the intensity of the driving power transmitted from the power controlling unit 14 to the power unit 12 is able to be maintained, and the intensity of the electric signal transmitted from the power unit 12 to the power controlling unit 14 is able to be maintained, thus the vehicle 1 may have better efficiency in operation.

Reference is made to FIGS. 4 and 5. In some embodiments, since the power controlling unit 14, the power unit 12, and the battery container 102 are adjacent to each other, not only the wirings between the power controlling unit 14 and the power unit 12 are able to be shortened, but also the convergence of the wirings (e.g. the transmission fine) is more facilitated, thereby improving the neatness of the wirings and increasing the protection of the wirings.

Furthermore, as shown in FIG. 4, since the hand bar 169 and the power controlling unit 14 are located at the front of the vehicle 1, a length of a relevant wiring (e.g. hand bar transmission line 170) connected between the hand bar 169 and the power controlling unit 14 is able to be shortened, so as to reduce the loss of the power and/or the electric signal due to the length of the relevant wiring. Hence, the intensity of the electrical signal generated by the hand bar 169 is able to be maintained, thus the vehicle 1 may have better efficiency in operation.

Figure 6:
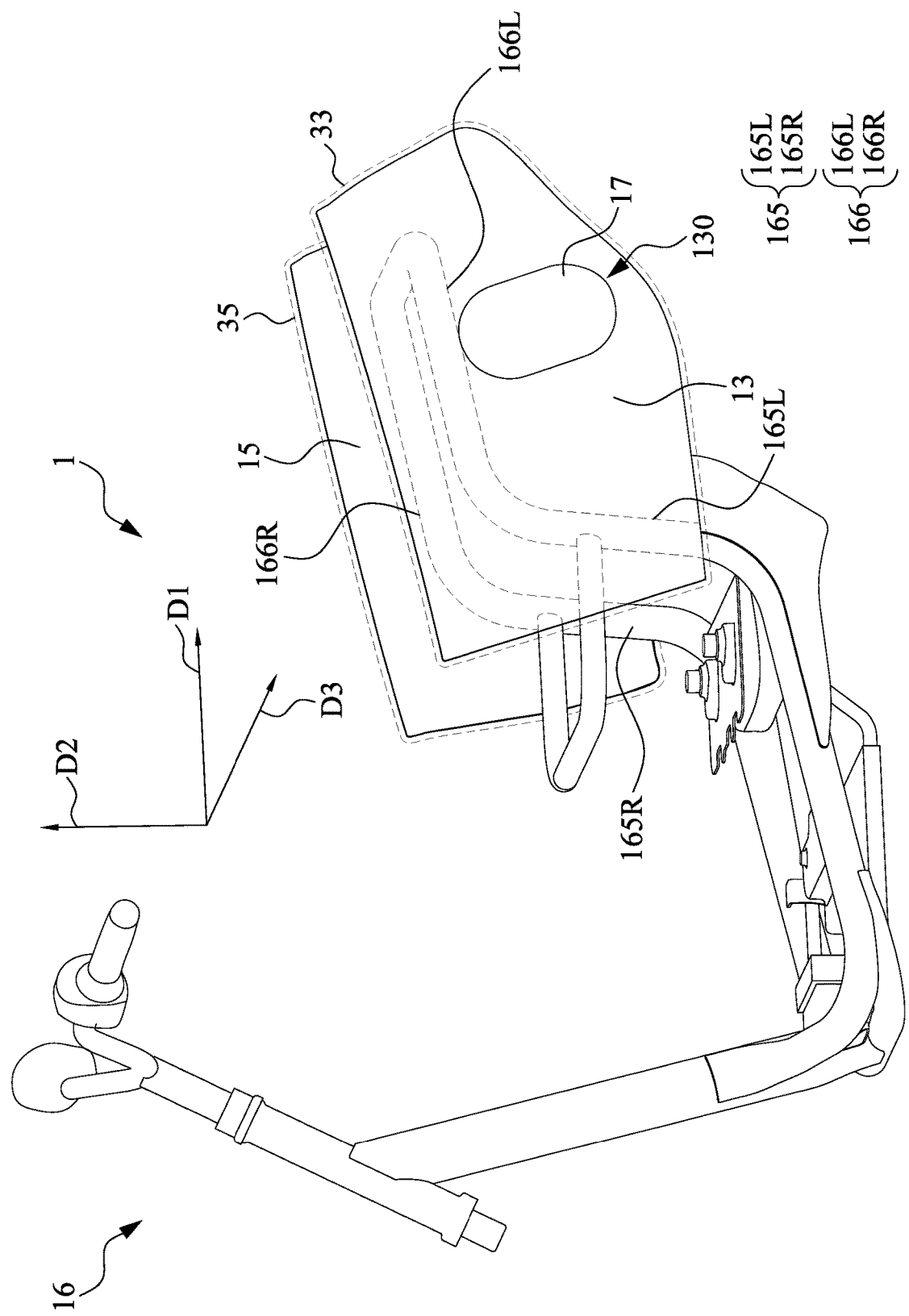
FIGS. 6 and 7 are side views of the main frame and some relative devices of the vehicle along a width direction of the vehicle in different views respectively in accordance with some embodiments of the present disclosure.
Figure 7:
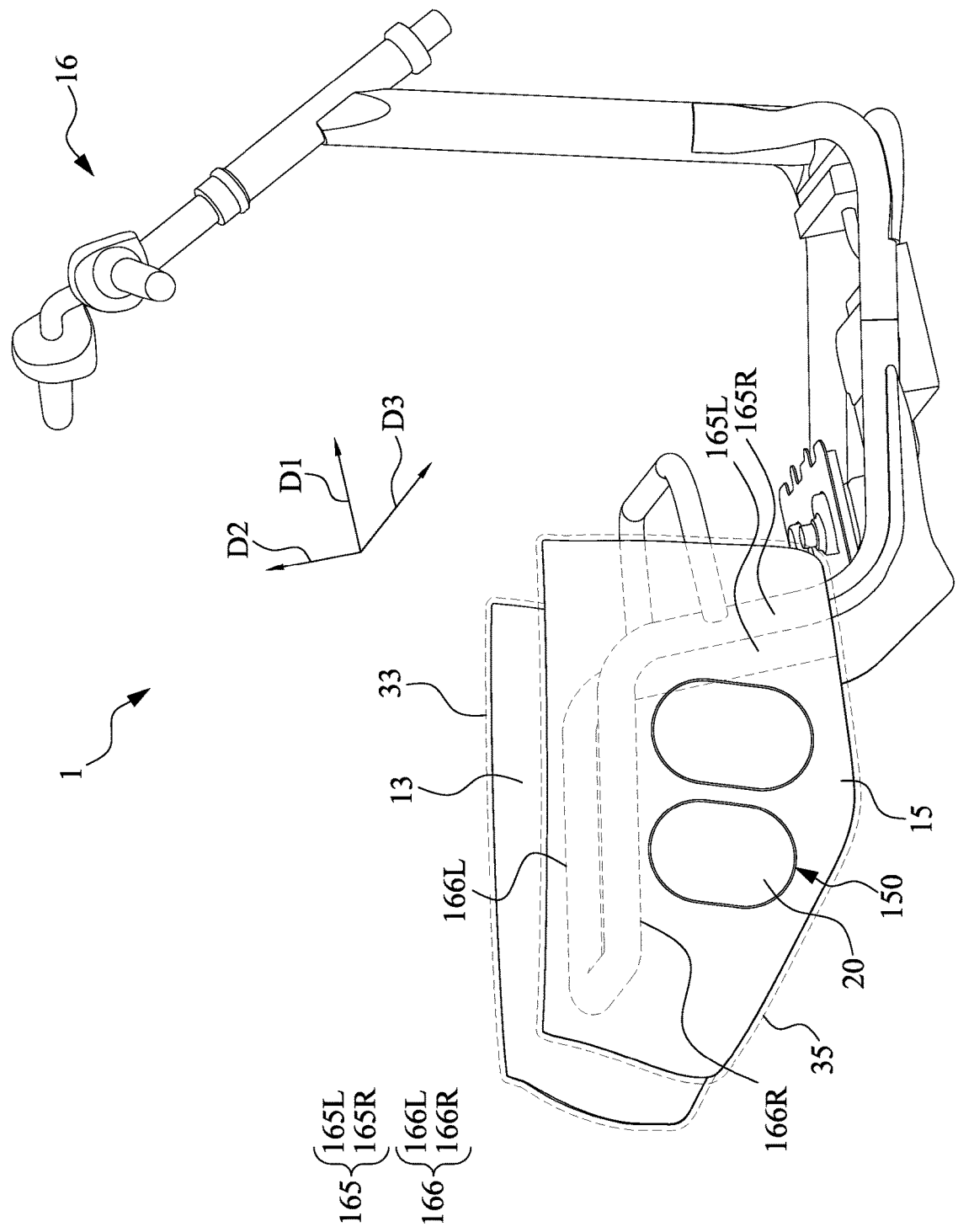

Reference is made to FIGS. 6 and 7. FIGS. 6 and 7 are side views of the main frame 16 and some relative devices of the vehicle 1 along the width direction D3 of the vehicle 1 in different views respectively in accordance with some embodiments of the present disclosure. It is noted that, the difference between the present embodiment and that in FIG. 2 is in that the vehicle 1 further includes a first side board 13, a second side board 15, a first decorating board 33, and a second decorating board 35.

As shown in FIG. 6, the first side board 13 is locked to the rising frame 165, at least covers the left sub-rising frame 165L, the left sub-rear frame 166L, and the third accommodating space 108 (see FIG. 3) in the width direction D3 of the vehicle 1, and has a through hole 130. In some embodiments, the through hole 130 of the first side board 13 exposes an internal device of the vehicle 1, such that the internal device is configured to leave or be detachably disposed in the second accommodating space 107 (see FIG. 3) formed by the rear frame 166 via the through hole 130 of the first side board 13. For example, the through hole 130 of the first side board 13 exposes the water tank 17, such that the water tank 17 is configured to leave or be detachably disposed in the second accommodating space 107 via the through hole 130 of the side board 13. The first decorating board 33 covers the first side board 13 in the width direction D3 of the vehicle 1 to decorate the vehicle 1 or to protect components in the vehicle 1.

As shown in FIG. 7, the second side board 15 is locked to the rising frame 165, at least covers the right sub-rising frame 165R, the right sub-rear frame 166R, and the third accommodating space 108 (see FIG. 3) in the width direction D3 of the vehicle 1, and has a through hole 150. The through hole 150 of the second side board 15 exposes the electronic controlling unit 20, such that the electronic controlling unit 20 is configured to leave or be detachably disposed in the second accommodating space 107 (see FIG. 3) via the through hole 150 of the second side board 15. The second decorating board 35 covers the second side board 15 in the width direction D3 of the vehicle 1 to decorate the vehicle 1 or to protect components in the vehicle 1.

In the embodiment, the water tank 17 and the electronic controlling unit 20 are detachable components, respectively and are also referred to as internal devices. Since the water tank 17 and the electronic controlling unit 20 are exposed from the first side board 13 and the second side board 15 through the through hole 160 and through hole 150 respectively, the entire vehicle 1 does not need to be dismantled to maintain or to repair the water tank 17 (e.g. adding cooling water to the water tank 17) and/or the electronic controlling unit 20 (and/or the primary battery module), so as to improve the convenience of maintenance and repair of the vehicle 1.

According to the foregoing recitations of the embodiments of the disclosure, it can be seen that the center of gravity of the main frame is substantially located at a central position of the vehicle in the front-rear direction, such that when the vehicle is driven, the stability of the vehicle in the front-rear direction is able to be improved. As a result, the rider is able to more easily control the vehicle and has better comfort during the riding. Furthermore, the battery receiving module is disposed at the center of gravity of the frame and the position of the power controlling unit, the power unit and/or other components in the vehicle is set according to the center of gravity of the main frame. Therefore, the weight distribution of the vehicle on the front wheel and the rear wheel is able to be adjusted to a substantially similar ratio, so that the rider may feel better maneuverability during the riding, and may reduce the instability caused by the inertia when the car body is urgently braking.

Furthermore, since the power controlling unit and the power unit is disposed at a periphery of the battery connecting unit of the battery receiving module, a length of a relevant wiring is able to be shortened, so as to reduce the loss of the power and/or the electric signal due to the length of the relevant wiring.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A vehicle, comprising:
   a main frame;
   a power unit disposed on the main frame;
   a power controlling unit disposed on the main frame; and
   a battery receiving module disposed on the main frame and disposed between the power unit and the power controlling unit in a front-rear direction of the vehicle wherein the battery receiving module comprises a battery container and a battery connecting unit, and the battery container is mounted on the battery connecting unit and covers a center of gravity of the main frame in a top-bottom direction of the vehicle.

2. The vehicle of claim 1, wherein the main frame comprises a front frame, a lower frame, and a rising frame, and the lower frame is connected between the front frame and the rising frame.

3. The vehicle of claim 2, wherein the lower frame extends away from the rising frame along a first extending direction, the rising frame extends away from the lower frame along a second extending direction, and the first extending direction and the second extending direction form an obtuse angle.

4. The vehicle of claim 2, wherein the lower frame extends along a first extending direction, the front frame extends along a second extending direction, and the first extending direction is substantially perpendicular to the second extending direction.

5. The vehicle of claim 2, wherein the power controlling unit is disposed on the lower frame and located at a side of the lower frame adjacent to the front frame.

6. The vehicle of claim 5, wherein the lower frame comprises a left sub-lower frame and a right sub-lower frame substantially extending along the front-rear direction of the vehicle, and the power controlling unit is disposed between the left sub-lower frame and the right sub-lower frame.

7. The vehicle of claim 5, wherein the power controlling unit is lower than a top surface of the lower frame facing toward the battery receiving module in a top-bottom direction of the vehicle.

8. The vehicle of claim 5, wherein the power controlling unit and the battery receiving module are spaced apart from each other in the front-rear direction of the vehicle.

9. The vehicle of claim 2, wherein the battery receiving module is located at a side of the rising frame closest to the front frame.

10. The vehicle of claim 2, wherein the power unit is located at a side of the rising frame facing away from the lower frame, and the lower frame is located between the power unit and the battery receiving module in a top-bottom direction of the vehicle.

11. The vehicle of claim 2, further comprising:
a front wheel disposed on the main frame; and
a rear wheel disposed on the main frame, wherein the lower frame is located between the front wheel and the rear wheel and is spaced apart from the front wheel and the rear wheel in the front-rear direction of the vehicle.

12. The vehicle of claim 11, wherein an axle of the front wheel and an axle of the rear wheel define a virtual extension surface, and the lower frame and the rising frame are respectively located at opposite sides of the virtual extension surface.

13. The vehicle of claim 12, wherein the lower frame extends in an extending direction substantially perpendicular to the virtual extension surface.

14. The vehicle of claim 11, wherein an axle of the front wheel and an axle of the rear wheel define a virtual extension surface, and the lower frame and the front frame are respectively located at opposite sides of the virtual extension surface.

15. The vehicle of claim 2, further comprising:
a water tank disposed on the main frame and located at a side of the rising frame facing away from the lower frame; and a side board disposed on the main frame, covering the rising frame in a width direction of the vehicle, and having a through hole, wherein the water tank is configured to leave or be detachably disposed on the main frame via the through hole of the side board.

16. The vehicle of claim 15, wherein the main frame further comprises a rear frame connected to an end of the rising frame opposite to the lower frame and substantially extending away from the rising frame along the front-rear direction of the vehicle, and the water tank is located between the rear frame and the rising frame.

17. The vehicle of claim 2, further comprising:
an electronic controlling unit disposed on the main frame and located at a side of the rising frame facing away from the lower frame; and
a side board disposed on the main frame, covering the rising frame in a width direction of the vehicle, and having a through hole, wherein the electronic controlling unit is configured to leave or be detachably disposed on the main frame via the through hole of the side board.

18. The vehicle of claim 1, wherein a center of gravity of the power controlling unit is spaced apart from the center of gravity of the main frame by a first distance in the front-rear direction, a center of gravity of the power unit is spaced apart from the center of gravity of the main frame by a second distance in the front-rear direction, and a product of a weight of the power controlling unit and the first distance is substantially equal to a product of the weight of the power unit and the second distance.

19. A vehicle, comprising:
a main frame comprising a front frame, a lower frame, and a rising frame connected in sequence;
an internal device disposed on the main frame and located at a side of the rising frame facing away from the lower frame; and
a side board disposed on the rising frame, covering the rising frame in a width direction of the vehicle, and having a through hole, wherein the internal device is configured to leave or be detachably disposed on the main frame via the through hole of the side board.

20. The vehicle of claim 19, wherein the main frame further comprises a rear frame connected to an end of the rising frame opposite to the lower frame and substantially extending away from the rising frame along a front-rear direction of the vehicle, and the internal device is disposed between the rear frame and the rising frame.

21. The vehicle of claim 19, further comprising:
a front wheel disposed on the main frame; and
a rear wheel disposed on the main frame, wherein an axle of the front wheel and an axle of the rear wheel define a virtual extension surface, and the lower frame and the inner device are respectively located at opposite sides of the virtual extension surface.

22. The vehicle of claim 19, wherein the internal device is a water tank.

23. The vehicle of claim 19, wherein the internal device is an electronic controlling unit.

* * * * *